US006567789B1

(12) United States Patent
Baker

(10) Patent No.: US 6,567,789 B1
(45) Date of Patent: May 20, 2003

(54) METHOD AND SYSTEM FOR ELECTRONIC EXCHANGE OF TAX INFORMATION

(76) Inventor: Samuel R. Baker, 624 Raintree Rd., Buffalo Grove, IL (US) 60089

( * ) Notice: Subject to any disclaimer, the term of this patent is extended or adjusted under 35 U.S.C. 154(b) by 0 days.

(21) Appl. No.: 09/481,118

(22) Filed: Jan. 11, 2000

Related U.S. Application Data

(63) Continuation-in-part of application No. 09/376,283, filed on Aug. 18, 1999, now Pat. No. 6,473,741.
(60) Provisional application No. 60/105,744, filed on Oct. 26, 1998, and provisional application No. 60/106,581, filed on Nov. 2, 1998.

(51) Int. Cl.⁷ ............................. G06F 17/60; H04K 1/00
(52) U.S. Cl. ................................ 705/31; 705/1; 705/30; 380/24
(58) Field of Search ..................... 705/31, 1, 30; 380/24

(56) References Cited

U.S. PATENT DOCUMENTS 5,910,988 A * 6/1999 Ballard ........................ 380/24

FOREIGN PATENT DOCUMENTS

WO    WO 01/13260 A1 * 2/2001

OTHER PUBLICATIONS

Meridien Research, Inc., Data Mining Solutions and Customer Management, Dec. 1997.*
Craig Stedman, H&R Block Plans to Chop DOS, Computerworld, Apr. 6, 1998, p. 24.*
Ted Cornwell, Lenders increasingly Outsource Tax Payments from Escrow Accounts, National Mortgage News, Jun. 9, 1997, p. 22.*
Robert L. Black, et al. The Intranet–A Firm's Private Road on the Information Superhighway, The Tax Adviser, Sep. 1996 pp. 561–569.*
Robert L. Black, et al., Technology for Administering Taxes in the 1990s, Tax Executive, vol. 41, Issue 6, Nov./Dec. 1989, pp. 541–552.*
Robert L. Black, et al. Expert Systems, A New Tool to Enhance Tax Practice, The Tax Adviser, Jan. 1990 pp. 3–17.*

* cited by examiner

Primary Examiner—Richard Chilcot
Assistant Examiner—Jennifer I. Harle
(74) Attorney, Agent, or Firm—Meroni & Meroni, P.C.

(57) ABSTRACT

A communication link is established between a first processor and a receiving processor located at a central data repository. Tax return information in electronic form are then downloaded to the central data repository. The electronic tax information is then converted into a new standard electronic document having a standard format. The new standard electronic document is then sent into a first database where it is sorted and stored with the other standard electronic documents. A first copy of the standard electronic document is then sent through a filtering process in which all the data fields containing identifiable data such as names, social security codes, identification numbers, and street address are removed creating an electronic data mining document. The electronic data mining document is then sent to a second database where the data mining document is sorted and stored with other electronic data mining documents.

28 Claims, 3 Drawing Sheets

METHOD AND SYSTEM FOR ELECTRONIC EXCHANGE OF TAX INFORMATION

PRIOR HISTORY

This is a Continuation-In-Part Application claiming priority from the parent application U.S. application patent Ser. No. 09/376,283 filed on Aug. 18, 1999, U.S. Pat. No. 6,473,741 Provisional Application Ser. No. 60/105,744 filed on Oct. 26, 1998, and Provisional Application Ser. No. 60/106,581 filed on Nov. 2, 1998.

BACKGROUND OF THE INVENTION

1. Field of the Invention

The present invention relates to a method and a system for the electronic exchange of tax information which allows for the secured statistical study and easy access to the tax information, without compromising the confidentiality of the electronic tax information owner/taxpayer.

2. Description of the Prior Art

Tax information found on income tax returns and on other tax documents submitted to the Internal Revenue Service and other tax authorities contain a wealth of information which, if properly correlated, could provide a wealth of statistical data which could aid users of this information in more ways than simply better tax compliance. Tax information has considerable potential to shed insights and provide competitive advantages in the areas of finance, human behavior, industry, business, government, and marketing.

There are already a number of different institutions which would find value in the use of tax information. Currently, tax information is utilized by lending institutions in order to create statistical models determining the credit worthiness of a potential borrower. Lending institutions also typically require several years of tax returns from a potential borrower in order to determine the credit worthiness of a potential borrower. Businesses often take tax surveys to determine the tax impact on their profitability when selecting potential locations to build or locate its facilities. Businesses also typically use tax information to evaluate the profitability of a potential corporate acquisitions. There are many other commercial uses for tax information. However, many are not able to be implemented due to the lack of an easily accessible and statistically significant source of tax information.

Using tax information as a source of statistical data has not been used in the past due to perceived confidentiality issues and the difficulty in retrieving and organizing tax information. As a result, the IRS and the state governments are currently the only institutions which can provide tax information to the public on a large scale. However, in most instances, obtaining tax information from these entities is a long and often difficult process. Obtaining copies of tax returns from the IRS and state institutions, typically require a wait of 2 or more months. The IRS and state governments are simply not prepared or nimble enough to be the source of tax information exchange.

Furthermore, the IRS and state governments are limited in the type and amount of information they can provide to the public. In most instances tax information can only be obtained in paper form. Tax information in electronic form provides a more economical and efficient means of handling tax data. The handling of the paper income tax returns and the storage of these documents, and the manual inputting of this information into the computer applications using this information typically adds a significant cost in evaluating tax information. Furthermore, copies of tax information received in paper form are more easily doctored and made fraudulent, a very serious concern for businesses like lending institutions.

With the advent of electronic methods of filing income tax returns and with the advent of technologies which can convert the contents of a tax document into an electronic file, more and more tax information is stored in its electronic form. Most tax preparation firms, accounting firms and law firms currently maintain there own databases of tax information. However, these databases are not typically linked or shared, isolating the information stored in each individual database. Furthermore, there is no current standard format for the electronic storage of this tax information making the evaluation of this tax information from different databases quite difficult.

The aggregation of these databases into a central data repository increase the value of the tax information more so than if the tax information was marketed separately by the individual holders of the tax information. Also, greater efficiency can be achieved if the information is able to be disseminated electronically between the parties which can utilize this information.

Accordingly, there is a need for a readily available source of individual and corporate tax information with a statistically significant amount of tax information therein in order to perform accurate statistical analysis of tax information.

Accordingly, there is also a need for a readily available source of individual and corporate tax information which protects the confidentiality of the individuals and corporations which submitted tax information.

Accordingly, there is a further need for a readily available source of individual and corporate tax information which is accurate and easily accessible between interested parties.

Lastly, there is a further need for a readily available source of individual and corporate tax information in a standardized electronic form allowing for the easy integration and utilization of this information by the computer applications utilized by the interested parties.

The present invention is a method and a system for the electronic exchange of tax information which allows for the secured statistical study and easy access to the tax information, without compromising the confidentiality of the electronic tax information owner/taxpayer.

As will be described in greater detail hereinafter, the present invention solves the aforementioned and employs a number of novel features that render it highly advantageous over the prior art.

SUMMARY OF THE INVENTION

Accordingly, it is an object of my invention to provide a readily available source of individual and corporate tax information with a statistically significant amount of tax information therein, both quantitatively and qualitatively, thereby allowing for more accurate statistical analysis of tax information.

Accordingly, it is a further object of my invention to provide a readily available source of individual and corporate tax information with safeguards to protect the confidentiality of the individuals and corporations which submitted tax information.

Accordingly, it is a further object of my invention to provide a readily available source of individual and corporate tax information the contents of which are accurate and easily accessible between interested parties.

Lastly, it is a further object of my invention to provide a readily available source of individual and corporate tax information in a standardized electronic form allowing for the easy integration and utilization of this information by the computer applications utilized by the interested parties.

To achieve these objectives, and in accordance with the purposes of the present invention the following method and system for the electronic exchange of tax information is presented.

The present invention is a method and a system for the electronic exchange of tax information which allows for the secured statistical study and easy access to the tax information, without compromising the confidentiality of the electronic tax information owner/taxpayer.

Tax information kept in tax preparation firms, accounting firms and law firms are downloaded into a central data repository. The aggregation of this tax information into a central data repository increases the value of the tax information more so than if the tax information was marketed separately by the individual holders of the tax information. The central data repository acts as the aggregator and conduit of massive tax information. This tax information is then made readily accessible to the parties which are in need of this information. The dissemination of needed tax information is made quicker and more efficient due to the ability to electronically transfer this tax information to the parties which utilize this information.

A communication link is established between a first processor located at a tax preparation firm, accounting firm or law firm and a receiving processor located at the central data repository. Databases of tax return information that are in electronic form and owned by the tax preparation firms, accounting firms, and law firms are then downloaded to the central data repository.

A first copy of the electronic tax information is then made and the first copy of the electronic tax information is converted into a standard electronic document having a standard format. The standard electronic document has predefined data fields with a predefined order of data fields. The first copy of the electronic tax information is parsed in order to identify data to be placed within the predefined data fields. Data is then systematically extracted from the first copy of the electronic tax information and then placed into the appropriate data fields creating a new standard electronic document. The new standard electronic document is then sent into a first database where it is sorted and stored with the other standard electronic documents.

A first copy of the standard electronic document is then sent through a filtering process in which all the data fields containing identifiable data such as names, social security codes, identification numbers, and street address are removed creating a data mining document. The data mining document is then sent to a second database where the data mining document is sorted and stored with other data mining documents.

In order to obtain copies of the information stored within the first or second database, a request is submitted by a party for the release of tax information. Tax information is released to a third party in one of two ways. If the tax information requested requires that the identifiable data be included, such as requests for past income tax returns in order to submit to a lending institution for loan verification, an authorization from the owner of the tax information must be submitted with the request in order for the request to be carried out. The information is then searched for and copied from the first database by an output processor means.

If the tax information requested does not require identifiable data, such as requests for bulk data in order to perform data mining operations, the request will include specific criteria which the tax information must satisfy in order to be released. The output processor means then searches the second database and copies all the tax information which satisfies the criteria.

The format in which the tax information is to be delivered and the location to which the information will be delivered to is also included in the request. Once the requested tax information is gathered, the output processor initiates the delivery of this information.

Other objects, features, and advantages of the invention will become more readily apparent upon reference to the following description when taken in conjunction with the accompanying drawings.

DESCRIPTION OF THE PREFERRED EMBODIMENT

The present invention is a method and a system for the electronic exchange of tax information which allows for the secured statistical study and easy access to the tax information, without compromising the confidentiality of the electronic tax information owner/taxpayer.

Figure 1:
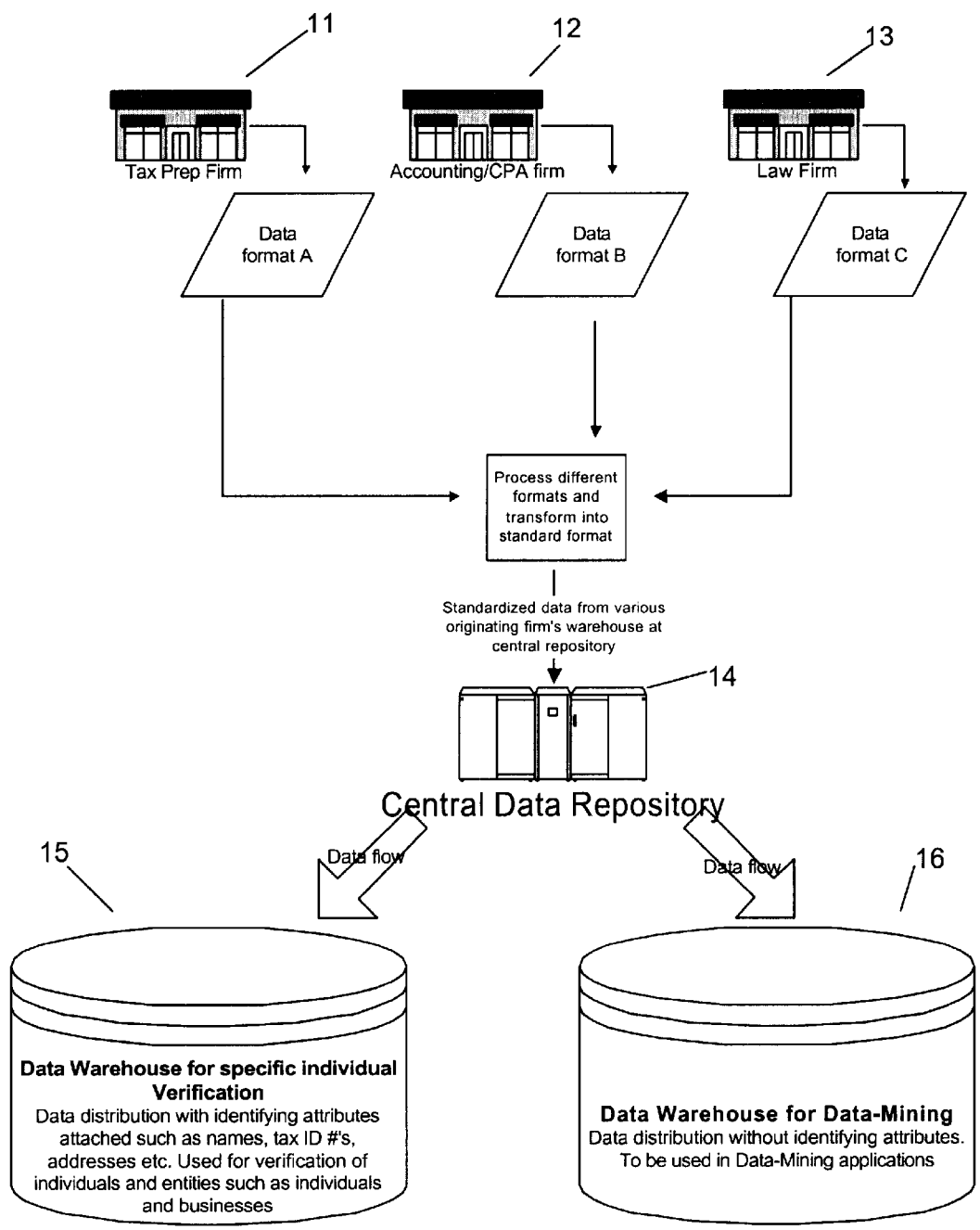
FIG. 1. A flow diagram of my method for the electronic exchange of tax information.
Figure 3:
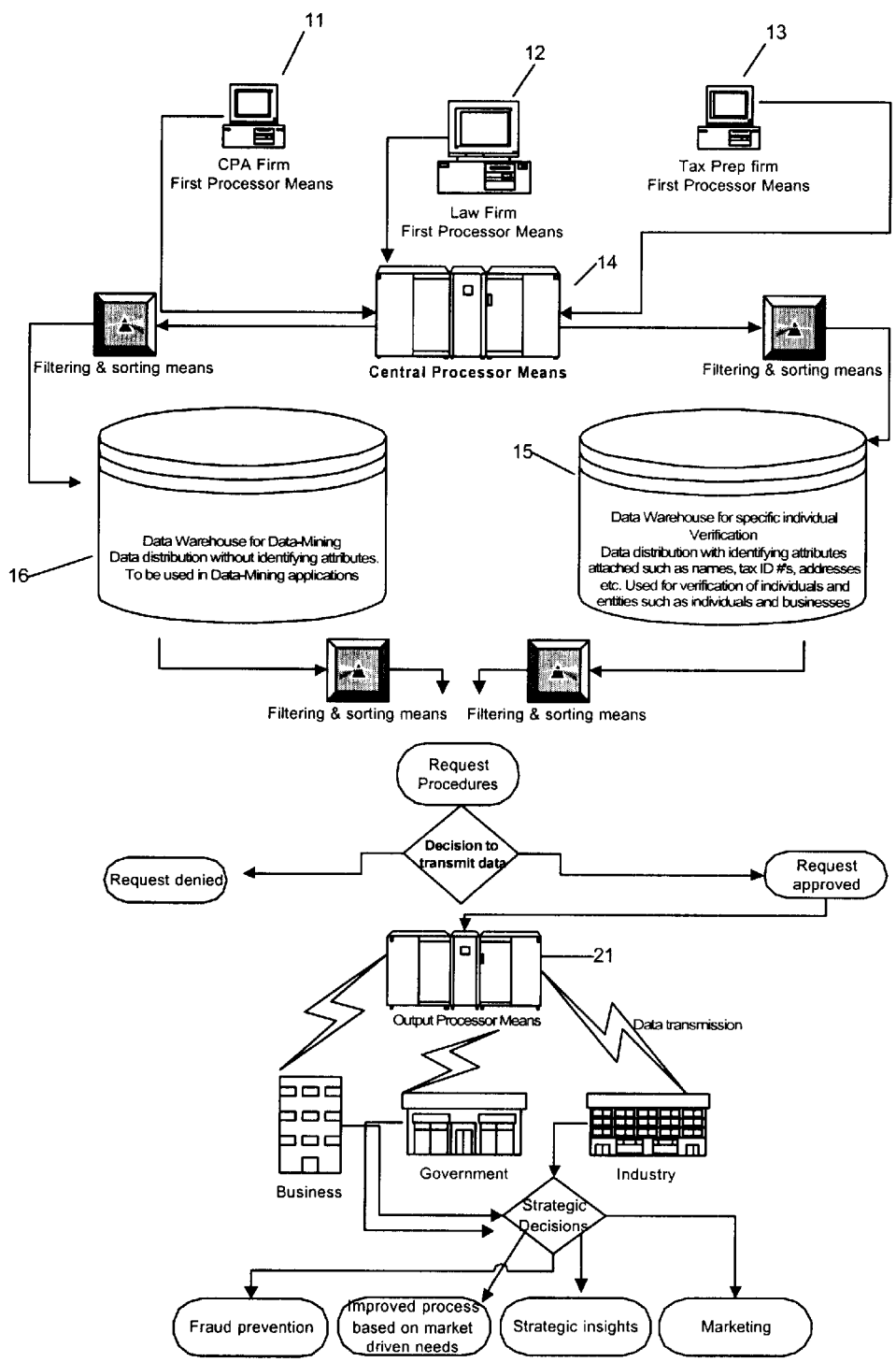
FIG. 3. A schematic diagram of my system for the electronic exchange of tax information.

Referring to FIGS. 1 and 3, a communication link is established between a first processor means located at a tax preparation firm 11, accounting firm 12 or law firm 13 and a central processor located at a central data repository 14. Databases of tax return information that are in electronic form and owned by the tax preparation firms, accounting firms, and law firms are then downloaded to the central data repository. In the preferred embodiment, this download of tax information is done as part of a regular backup procedure which uses the central data repository as an off-site archival of data.

The tax information located in the tax preparation firms 11, accounting firms 12, and law firms 13 are qualitatively and quantitatively more relevant to some businesses and industries than the tax information warehoused at the IRS and state governments. Valuable information typically kept by tax preparation firms 11, accounting firms 12, and law firms 13 but not kept by the IRS include birthdate, whether the taxpayer rents or owns his own home, charitable donations under $500, payors of interest and dividends, and numerous other types of information.

When the electronic tax information is received at the central data repository 14, the tax information is catalogued and stored in their original format. A first copy of the electronic tax information is then made and the first copy of the electronic tax information is converted into a standard electronic document having a standard format. The standard electronic document has predefined data fields with a predefined order of data fields. The first copy of the electronic tax information is parsed in order to identify data to be placed within the predefined data fields. Data is then systematically extracted from the first copy of the electronic tax information and then placed into the appropriate data fields creating a new standard electronic document. The new standard electronic document is then sent into a first database 15 where it is sorted and stored with the other standard electronic documents.

A first copy of the standard electronic document is then sent through a filtering process in which all the data fields containing identifiable data such as names, social security codes, identification numbers, and street address are removed creating an electronic data mining document. The electronic data mining document is then sent to a second database 16 where the data mining document is sorted and stored with other electronic data mining documents.

The removal of the identifiable data in the second database 16 removes many of the confidentiality issues which prevented the use of tax information in the past. The removal of the identifiable data allows the second database 16 to be analyzed using statistical and data mining techniques without a breach of confidentiality. With the massive amount of tax information included in the second database 16, the statistical analysis, the patterns, and relational information extracted from the study of the second database through statistical and data mining techniques become more relevant.

Figure 2:
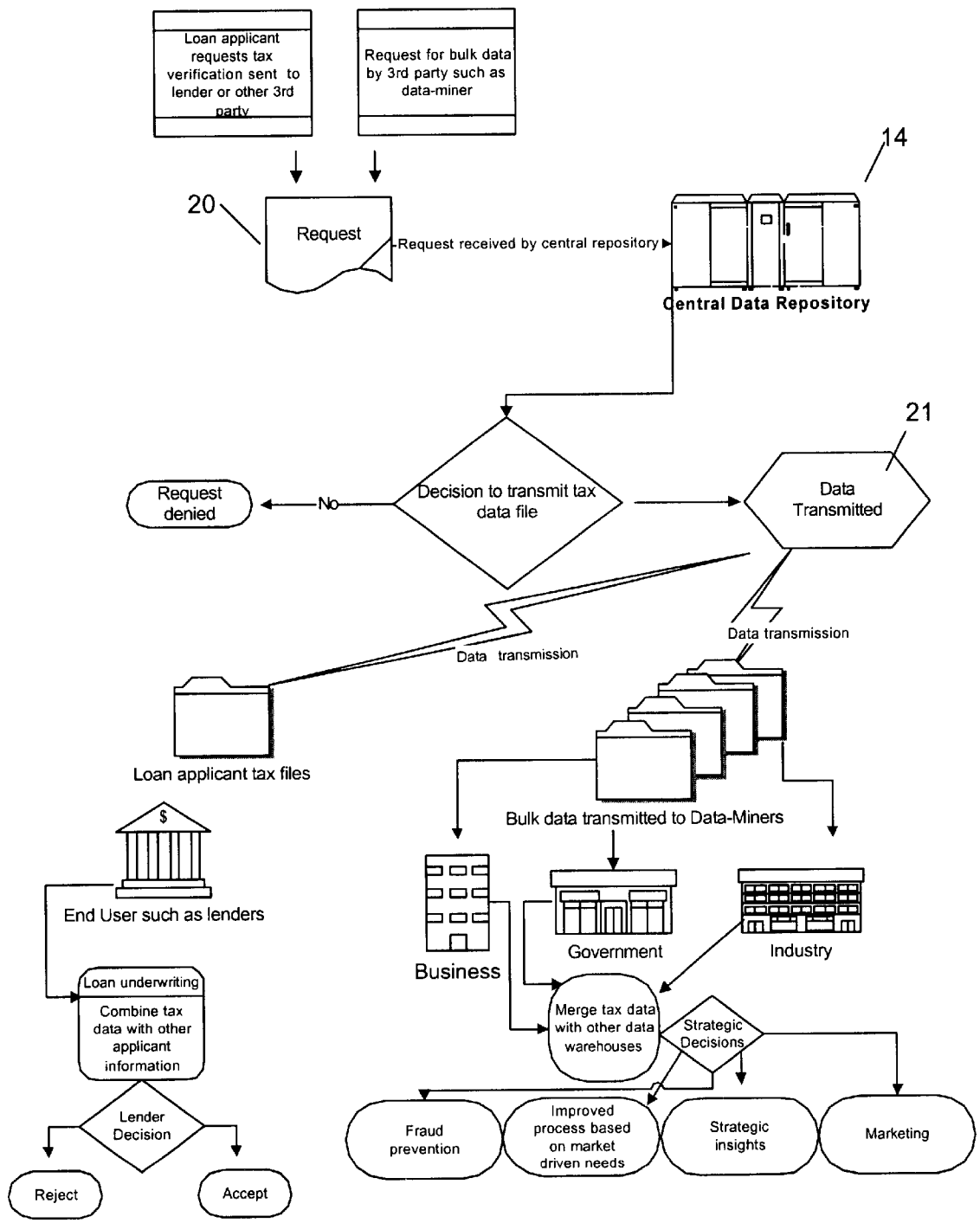
FIG. 2. A flow diagram of the process for the electronic exchange of information to third party recipients of that information.

Referring to FIGS. 2 and 3, in order to obtain information from the central data repository 14, a request 20 is submitted by a party for the release of requested tax information. The request 20 will typically include authorization for the release of the requested tax information, the criteria for the data to be selected, the format in which the requested tax information is to be delivered, and the destination to which the requested tax information will be delivered.

Requested tax information is released to a third party in one of two ways. If the requested tax information requires that the identifiable data be included, such as requests for past income tax returns to submit to a lending institution for loan verification, an authorization from the owner of the tax information/taxpayer must be submitted with the request 20 in order for the request to be carried out. If there is authorization and after the authorization is authenticated, the information is then searched for and copied from the first database 15 by an output processor means 21. If the tax information requested does not require identifiable data, such as requests for bulk data in order to perform data mining operations, the request will include specific criteria which the tax information must satisfy in order to be released. The output processor means 21 then searches the second database 16 and copies all the tax information which satisfies the criteria.

Once the requested tax information is gathered, the output processor 21 initiates the delivery of this information. The tax information may be printed out and sent via mail, but in the preferred embodiment, the tax information is formatted according to the request and downloaded directly into a requesting processor specified in the request.

The aggregation of tax information into a central data repository increases the value and the marketability of the tax information more so than if the tax information was marketed separately by the individual holders of the tax information. The central data repository acts as the aggregator and conduit of massive tax information. This tax information is then made readily accessible to the parties which are in need of this information. The dissemination of needed tax information is made quicker and more efficient due to the ability to electronically transfer information to the parties that need this information.

The invention described above is the preferred embodiment of the present invention. It is not intended that the novel device be limited thereby. The preferred embodiment may be susceptible to modifications and variations that are within the scope and fair meaning of the accompanying claims and drawings.

I claim:

1. A method for the electronic exchange of tax information which allows for easy access to the tax information without compromising the confidentiality of the electronic tax information owner/taxpayer, the method comprising:
   downloading tax information from various sources of tax information;
   storing the tax information into a first database;
   removing the identifiable characteristics out of the tax information creating an electronic data mining document;
   storing the electronic data mining document into a second database;
   receiving a request for requested tax information;
   determining whether the requested tax information has identifiable characteristics necessitating that the requested tax information be obtained from the first database or no identifiable characteristics necessitating that the requested tax information be obtained from the second database;
   copying the requested tax information from the first database or the second database; and
   delivering the requested tax information.

2. The method for the electronic exchange of tax information in claim 1 wherein tax information is downloaded from tax preparation firms, accounting firms, or law firms.

3. The method for the electronic exchange of tax information in claim 1 wherein the step of delivering the requested tax information is accomplished by transmitting the requested tax information to a requesting processor.

4. The method for the electronic exchange of tax information in claim 1 including the additional step of converting the tax information into a standard electronic document prior to storing the electronic tax information into the first database.

5. A method for storing tax information having varied formats and coming from various locations which allows for the easy access of tax information without compromising the confidentiality of the electronic tax information owner/taxpayer, the method comprising:

receiving electronic tax information;

parsing the electronic tax information to identify data to be placed within a predefined data field in a standard electronic document;

extracting the data from the electronic tax information;

placing the extracted data into the appropriate predefined data field within a standard electronic document creating a new standard electronic document;

storing a first copy of the new standard electronic document into a first database;

creating a data mining document by removing data fields within the new standard electronic document having identifying data; and storing the data mining document in a second database.

6. The method for storing tax information in claim 5 further comprising the additional step of sorting the standard electronic documents in the first database after the new standard electronic document is stored.

7. The method for storing tax information in claim 5 further comprising the additional step of sorting the second database after the data mining document is stored.

8. The method for storing tax information in claim 5 further comprising an additional step prior to receiving an electronic document of sending electronic tax information from a tax preparation firm, an accounting firm, or a law firm.

9. The method for storing tax information in claim 8 further comprising an additional step prior to sending the tax document of obtaining written authorization from the tax document owner to send the tax document.

10. The method for storing tax information in claim 5 further comprising an additional step after receiving the tax information of storing the tax information in its original format.

11. A method for storing tax information having varied formats and coming from various locations which allows for the easy access of the tax information without compromising the confidentiality of the electronic tax information owner/taxpayer, the method comprising:

receiving electronic tax information;

converting the electronic tax information into a standard electronic document;

storing the standard electronic document into a first database;

creating a data mining document by removing data fields from the standard electronic document that have identifying data therein; and storing the data mining document in a second database.

12. The method for storing tax information in claim 11 further comprising an additional step prior to receiving an electronic document of sending electronic tax information from a tax preparation firm, an accounting firm, or a law firm.

13. The method for storing tax information in claim 12 wherein the process of converting the electronic tax information includes the steps of parsing the electronic tax information to identify data to be placed within predefined data fields, extracting the data from the electronic tax information, placing the extracted data into predefined fields within a standard electronic document creating a new standard electronic document.

14. The method for storing tax information in claim 13 further comprising an additional step prior to sending the tax document of obtaining written authorization from the tax document owner to send the tax document.

15. The method for storing tax information in claim 14 further comprising the additional step of sorting the standard electronic documents in the first database.

16. The method for storing tax information in claim 15 further comprising the additional step of sorting the second database.

17. The method for storing tax information in claim 16 further comprising an additional step after receiving the tax information of storing the tax information in its original format.

18. A system for the electronic exchange of tax information which allows for easy access to the tax information without compromising the confidentiality of the electronic tax information owner/taxpayer, the system comprising:

a first processor means;

a central processor means, the central processor means having a communication link to the first processor means and receiving electronic tax information from the first processor means, the central processor means having an algorithmic means for converting electronic tax information into a standard electronic document;

a first database, the first database having a communication link with the first processor means, the first database receiving and storing standard electronic documents sent from the central processor means;

a filtering means, the filtering means having a communication link with the central processor means, the filtering means receiving a copy of the standard electronic document from the central processor means, and creating a data mining document by removing data fields within the standard electronic document which has identifying data within; and a second database, the second database having a communication link with the filtering means, the second database receiving and storing the data mining document received from the filtering means.

19. The system in claim 18 further comprising a first output processing means, the first output processing means having a communication link with the first and second database, means for obtaining a copy of a particular standard electronic document within the first database, and a means for transmitting the particular standard electronic document to a requesting processor.

20. The system in claim 19 wherein the first output processing means has a means for printing a hardcopy of the particular standard electronic document.

21. The system in claim 20 wherein the output processing means has a communication link with the second database and a means for selecting data mining documents within the second database which satisfy a criteria based request, and a means for transmitting the plurality of data mining documents to a requesting processor.

22. The system in claim 21 further comprising a request processing means, the request processing means having a communication link with the output processing means, the request processing means receiving requests for tax information.

23. The system in claim 22 wherein the first database has a sorting processor means for sorting the standard electronic documents within the first database.

24. The system in claim 23 wherein the second database has a second sorting processor means for sorting the data mining documents within the second database.

25. A method for the electronic exchange of tax information without compromising the confidentiality of the electronic tax information owner/taxpayer from a central data repository with a first database having tax information with identifying data and a second database having tax information with no identifying data, the method comprising:

receiving a request to deliver tax information, the request having a set of criteria determining requested tax information to be delivered and a destination for the tax information;

determining whether to obtain the requested tax information from the first database or the second database;

retrieving the requested tax information from either the first database or the second database; and delivering the requested tax information to the destination.

26. The method for the electronic exchange of tax information in claim 25 wherein the step for determining whether to obtain the tax information from the first database or the second database includes the steps of determining whether identifying data is required in the tax information requested and determining whether there is sufficient authorization to proceed.

27. The method for the electronic exchange of tax information in claim 26 wherein the step of retrieving the requested tax information includes the steps of determining what tax information satisfies the criteria given in the request and determining where in either the first database or the second database is the requested tax information located.

28. The method for the electronic exchange of tax information in claim 27 wherein the step of delivering the requested tax information to the third party includes the steps of establishing a communication link to a requesting processor and directly loading the tax information into the requesting processor.

* * * * *